(12) United States Patent
Chou

(10) Patent No.: US 7,065,446 B2
(45) Date of Patent: Jun. 20, 2006

(54) REAL-TIME SMART MOBILE DEVICE FOR LOCATION INFORMATION PROCESSING

(75) Inventor: Yue-Hong Chou, Fountain Valley, CA (US)

(73) Assignee: GeoSpatial Technologies, Inc., Santa Ana, CA (US)

( * ) Notice: Subject to any disclaimer, the term of this patent is extended or adjusted under 35 U.S.C. 154(b) by 30 days.

(21) Appl. No.: 10/027,390

(22) Filed: Dec. 21, 2001

(65) Prior Publication Data

US 2002/0055817 A1 May 9, 2002

Related U.S. Application Data

(63) Continuation-in-part of application No. 09/641,302, filed on Aug. 18, 2000, now Pat. No. 6,363,320.

(60) Provisional application No. 60/258,409, filed on Dec. 26, 2000.

(51) Int. Cl.
*G01C 21/26* (2006.01)
(52) U.S. Cl. ..................... 701/207
(58) Field of Classification Search ............... 700/200, 700/207, 213–217, 220–222; 342/357.09, 342/357.1, 357.12, 357.15, 357.03, 358; 455/404.1, 404.2, 521
See application file for complete search history.

(56) References Cited

U.S. PATENT DOCUMENTS

| 5,129,605 | A | * | 7/1992 | Burns et al. ............... 246/5 |
| 5,400,020 | A | | 3/1995 | Jones et al. |
| 5,587,715 | A | | 12/1996 | Lewis |
| 5,809,396 | A | | 9/1998 | Armbruster et al. |
| 5,841,396 | A | | 11/1998 | Krasner |
| 5,920,821 | A | | 7/1999 | Seazholtz et al. |
| 5,959,577 | A | | 9/1999 | Fan et al. |
| 6,067,484 | A | * | 5/2000 | Rowson et al. ............... 701/16 |
| 6,088,594 | A | | 7/2000 | Kingdon et al. |
| 6,091,957 | A | | 7/2000 | Larkins et al. |
| 6,133,853 | A | | 10/2000 | Obradovich et al. |
| 6,141,621 | A | | 10/2000 | Piwowarski et al. |
| 6,177,905 | B1 | | 1/2001 | Welch |
| 6,185,427 | B1 | | 2/2001 | Krasner et al. |
| 6,188,956 | B1 | | 2/2001 | Walters |
| 6,198,390 | B1 | | 3/2001 | Schlager et al. |
| 6,199,010 | B1 | | 3/2001 | Richton |
| 6,202,023 | B1 | | 3/2001 | Hancock et al. |
| 6,212,472 | B1 | | 4/2001 | Nonaka et al. |
| 6,212,474 | B1 | | 4/2001 | Fowler et al. |
| 6,222,483 | B1 | | 4/2001 | Twitchell et al. |
| 6,225,944 | B1 | | 5/2001 | Hayes |
| 6,226,590 | B1 | | 5/2001 | Fukaya et al. |
| 6,236,358 | B1 | | 5/2001 | Durst et al. |

(Continued)

*Primary Examiner*—Thu V. Nguyen
(74) *Attorney, Agent, or Firm*—Myers. Dawes Andras & Sherman LLP; Vic Lin

(57) ABSTRACT

A smart location information processor automatically detects the location of a moving object in real-time, using either a receiver from the satellites or from any terrestrial location detection network. The device processes the location information and activates responsive functions according to location and status. Messages are transmitted through one of multiple wireless communication networks to other units. At any time, the device may receive instructions wirelessly from other stationary or mobile objects. All the events of the installed moving object are stored in a history file which can be sent to a remote server and then cleared from the installed object, either regularly or instantaneously. The device in one object may automatically activate certain functions controlling the object in response to the location of another object installed with the same device.

27 Claims, 10 Drawing Sheets

U.S. PATENT DOCUMENTS

| | | |
|---|---|---|
| 6,236,365 B1 | 5/2001 | LeBlanc et al. |
| 6,239,721 B1 * | 5/2001 | Smith .................... 340/825.49 |
| 6,285,315 B1 * | 9/2001 | Pratt ..................... 342/357.09 |
| 6,338,152 B1 * | 1/2002 | Fera et al. .................... 714/48 |
| 6,373,403 B1 * | 4/2002 | Korver et al. .............. 340/988 |
| 6,466,950 B1 * | 10/2002 | Ono ............................ 707/201 |
| 6,542,743 B1 * | 4/2003 | Soliman ..................... 455/436 |
| 6,681,157 B1 * | 1/2004 | Kageyama ..................... 701/1 |
| 2001/0001763 A1 * | 5/2001 | Ito .............................. 455/512 |
| 2002/0171581 A1 * | 11/2002 | Sheynblat et al. ..... 342/357.09 |

* cited by examiner

Figure 2 Communication Component

Figure 3 Data Flow of Communication Component

Figure 4 Location Component

Figure 5 Data Flow of Location Component

Figure 6 I/O Ports for External Function Control

Figure 7 I/O External Device Flow

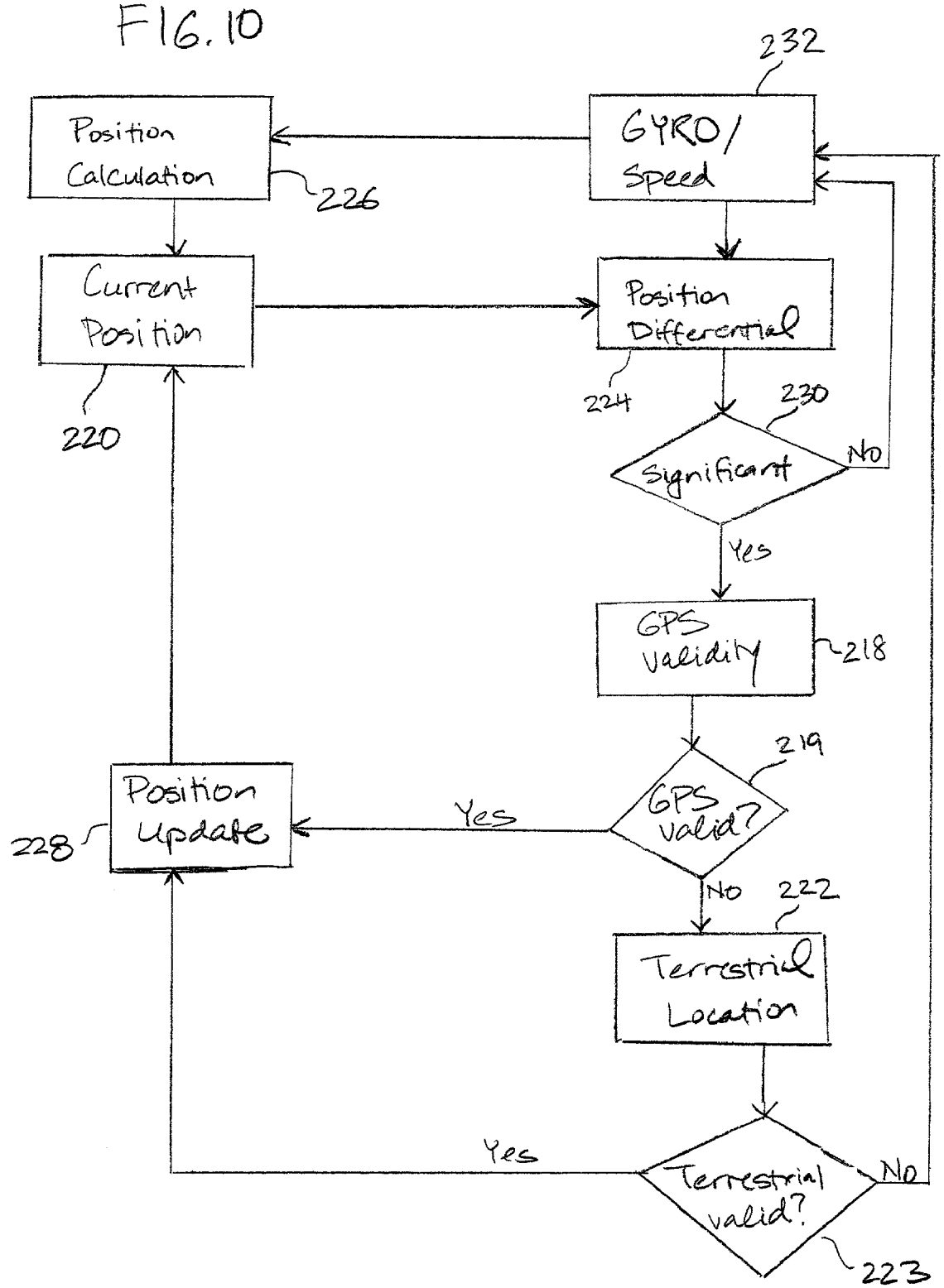

REAL-TIME SMART MOBILE DEVICE FOR LOCATION INFORMATION PROCESSING

RELATED APPLICATIONS

The present application is a continuation-in-part of application Ser. No. 09/641,302, now U.S. Pat. No. 6,363,320 filed on Aug. 18, 2000 and entitled THIN-CLIENT REAL-TIME INTERPRETIVE OBJECT TRACKING SYSTEM, incorporated herein by reference. The present application further relates to and claims priority from U.S. Provisional Application No. 60/258,409 filed on Dec. 26, 2000 and entitled REAL-TIME SMART MOBILE DEVICE FOR LOCATION INFORMATION PROCESSING, incorporated herein by reference.

BACKGROUND OF THE INVENTION

1. Field of the Invention

The invention relates to the field of wireless locational devices for installation in mobile objects or vehicles, and in particular to systems with multiple means for determining location.

2. Description of the Prior Art and Related Information

Currently, all the existing asset-tracking systems use only one single communication network. The most serious drawback is the existence of communication holes in the communication network utilized where the system provides no coverage. As such, the transmission of location data and other activity requests between objects may be disconnected from time to time.

Therefore, what is needed is some type of apparatus and method whereby communication holes in the communication network utilized does not cause loss of coverage.

In addition, what is needed is a mobile communication and control system that can be responsive in a way which is dependent on its location and dependent on the existence or characteristics of objects or other vehicles which are present at that location.

BRIEF SUMMARY OF THE INVENTION

In accordance with the present invention, multiple communication platforms are provided to overcome the deficiencies of the prior art by ensuring at least one of the existing communication channels works at any time and at any given location. In terms of wireless communication capabilities, one of the differences between a preferred embodiment of a system and any other existing asset tracking system, is that a "Smart Location Information Processor" ("SLIP") can ensure continuous connection between an object installed with SLIP and both the communication server and other SLIP-equipped objects. SLIP is used in an environment in which there is a satellite positioning system and one or more terrestrially based location detection systems, such as described in Chou, "METHOD AND APPARATUS FOR CONTINUOUSLY LOCATING AN OBJECT," U.S. Pat. No. 6,327,533 (2001), which is incorporated herein by reference.

A design of an electronics device is provided which, when installed in a moving object, provides the following functions. First, the device automatically detects the location of the moving object in real-time, using either a receiver from the satellites of the Global Positioning System or from any terrestrial location detection network. Second, it has the capability of processing the location information and activates appropriate responsive functions according to the object's current location. Third, it transmits messages through a wireless communication network to one or more designated receiving units, such as a computer server or another moving object installed with adequate wireless communication devices. Fourth, at any time, it may receive messages through the wireless communication network from any one or more stationary or mobile objects. Fifth, it stores all the events of the installed moving object in a history file, including locations, the time, speed, and direction of each event, the type of event, sent and received messages, etc. The history file can be sent to a remote server and then cleared from the installed object, either on a regular basis or instantaneously. Sixth, the device in one object may automatically activate certain functions controlling the object in response to the location of another object installed with the same device, and either object can be moving or stationary.

To ensure the functions described above are fully supported at all times, the device may use six major components: (1) a smart, multi-channel wireless communication component such as a device combining a radio modem with adjustable frequency, a wireless LAN card, and a satellite-based communication module, (2) a multiple-platform location detection component including a GPS engine board to receive location signals from satellites of the Global Positioning System, a Radio Frequency receiver capable of detecting location from a terrestrial radio network, a wireless module capable of receiving short-range, localized data network with a location indicator, and a self-calculating module containing a gyro (directional) and a speed calculation unit, (3) a micro-processor with adequate processing speed and capacity to interpret information exchanged among the components, (4) a memory component such as a flash ROM with sufficient programming and storage capability, (5) multiple input-output ports to support data processing functions related to location-based information, and (6) a specially designed printed circuit board (PCB) to integrate all the components to perform location-based information processing. The device or overall system is referred to as the "Smart Location Information Processor", hereafter referred to as SLIP.

SLIP can be installed in any moving object such as a vehicle, a ship, an aircraft, a bicycle, or in any stationary object such as a building, a phone booth, a billboard, and others. The processor provides functions of information processing to receive, send, and manipulate information that varies according to the location of the object. SLIP has the capability to interpret, record, and generate the appropriate action in response to any type of registered events in real-time. It is useful for a great variety of applications. Some of its potential applications are listed further below.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 10 is a flow diagram illustrating the operation of the software modules in the location component.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

A smart location information processor automatically detects the location of a moving object in real-time, using either a receiver from the satellites or from any terrestrial location detection network. The device processes the location information and activates appropriate responsive functions according to the object's current location. Messages are transmitted through a wireless communication network to any one or more designated receiving units. At any time, the device may receive messages through the wireless communication network from other stationary or mobile objects. All the events of the installed moving object are stored in a history file which can be sent to a remote server and then cleared from the installed object, either on a regular basis or instantaneously. The device in one object or vehicle may automatically activate certain functions controlling the object or vehicle in response to the location of another object or vehicle installed with the same device.

Figure 1:
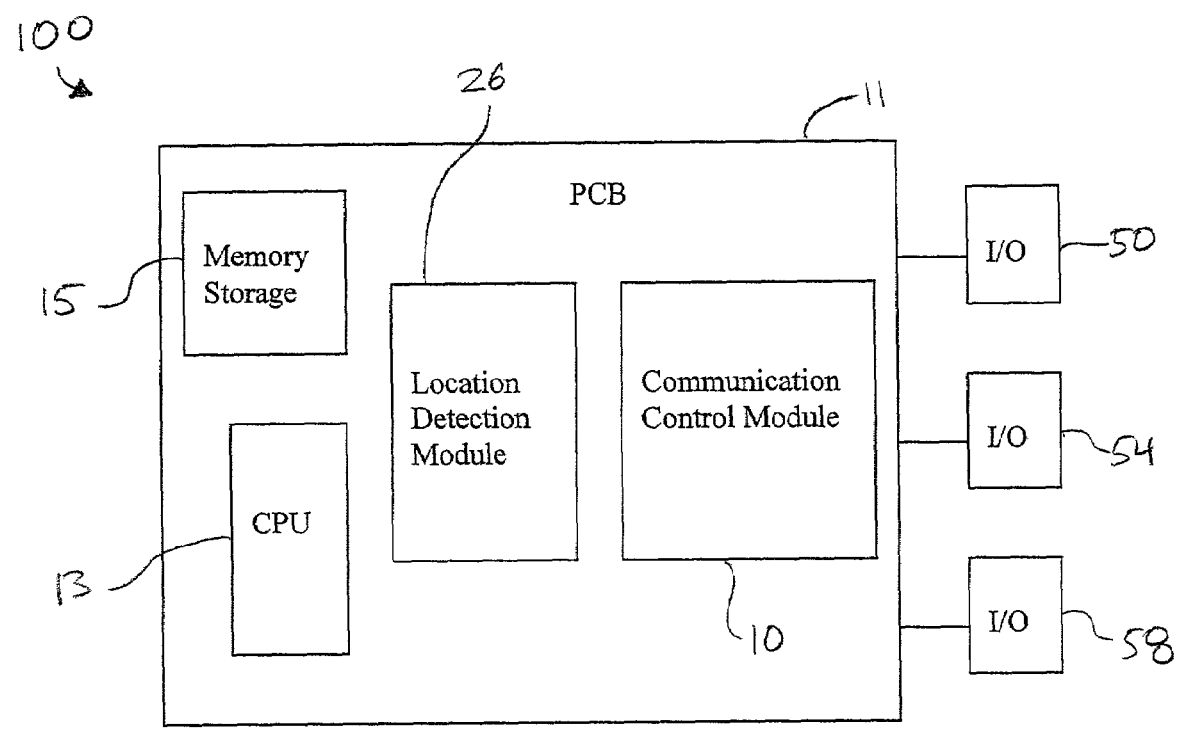
FIG. 1 is a block diagram of an overall SLIP system.

FIG. 1 is a block diagram showing the entire SLIP system or device, 100, as installed in an object or vehicle. A printed circuit board (PCB) 11 carries the components of SLIP and is housed in a chassis or housing (not shown). CPU 13 is coupled by PCB 11 to a memory storage 15. CPU 13 is also coupled via PCB 11 to a location detection module 26 described below in connection with FIG. 4, and to a communication control module 10 described in connection with FIG. 2. Input/output (I/O) ports 50, 54, 58 and 62 (shown in FIG. 6) are coupled to the above elements of the system 100 via PCB 11 as described in connection with FIG. 6. The function of each element and its interrelationship with other elements will become clear when the performance of each of the modules is considered in greater detail.

The following describes the main functionality and specifications of each of the six components or modules of SLIP system 100

Wireless Communication Component

Figure 2:
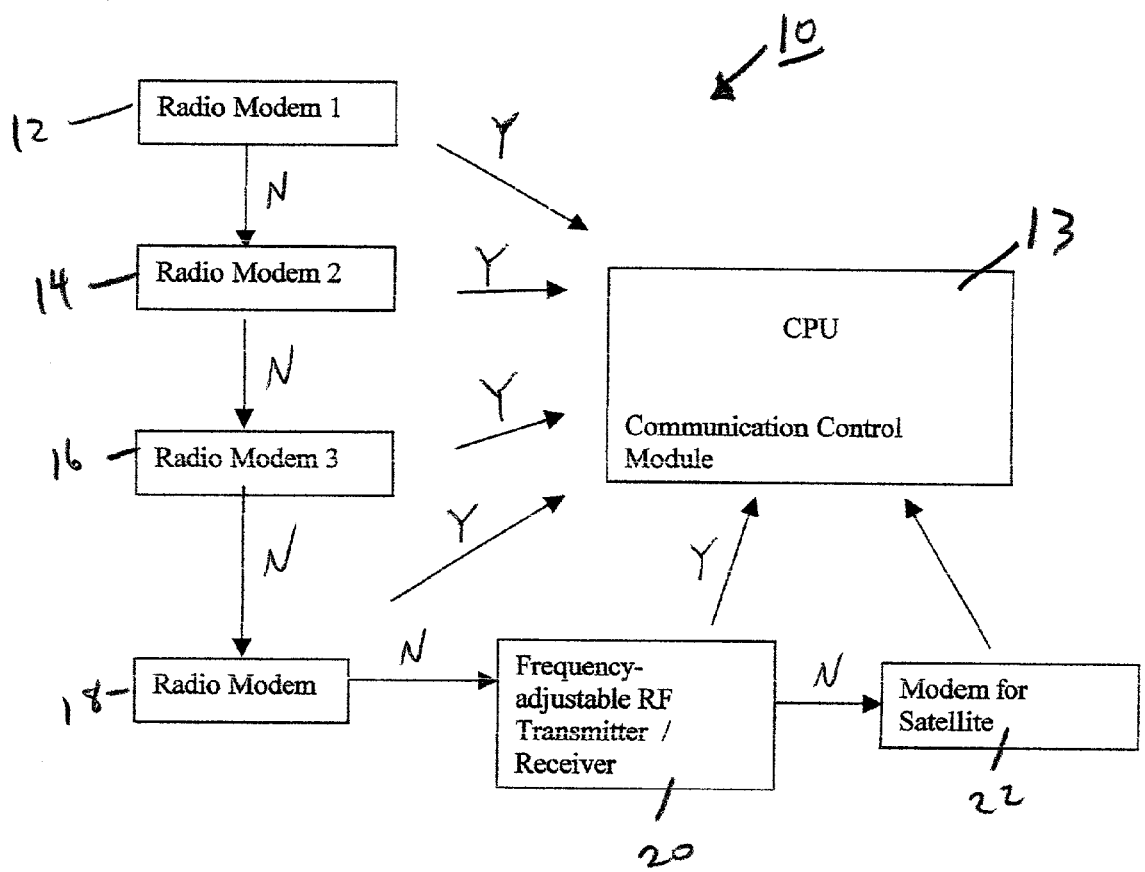
FIG. 2 is a block diagram of the communications component or section.

A wireless communication component or communication control module of SLIP, generally denoted in the block diagram of FIG. 2 by reference numeral 10, provides the means for receiving and sending information between the moving object in which SLIP is installed and one or more other external devices (not shown) installed in either stationary servers or mobile units (also not shown). SLIP is not limited to any specific type of wireless communication methodology or protocol, but may be used with or in any communication system, methodology or protocol now known or later devised.

Communication component 10 includes a plurality of radio modems, here symbolically represented by modems 12, 14, and 16, communicating with different external wireless data networks (not shown), a frequency adjustable RF transmitter and receiver 20, a radio modem 18 for wireless LAN, a radio modem 22 for satellite communications, and any other devices (not shown) that can transmit digital data wirelessly now known or later devised. One example is the RIM902 radio modem manufactured by Research In Motion. The RIM902 radio modem runs in the Mobitex digital wireless communication network operated by Cingular Wireless Data (previously known as BellSouth Wireless Data). Other radio modems can be used for other types of communication networks, e.g., CDPD, GSM, SMS, CDMA, TDMA, and others. SLIP can utilize any wireless communication system, including satellite communications, and can switch from one network to another when the signal strength of the first network is below a threshold level. All modems 12, 14, 16, 18 and 22 and transceiver 20 communicate with a communication control module or CPU 13, which is operated under software control. The software control which is required to operate the communication control module or CPU 13 in combination with the other elements described above is conventional, and one example is shown and described in connection with FIG. 3 below. However, it must be understood that firmware or logic controllers can be equivalently substituted for CPU 13 if desired.

Figure 3:
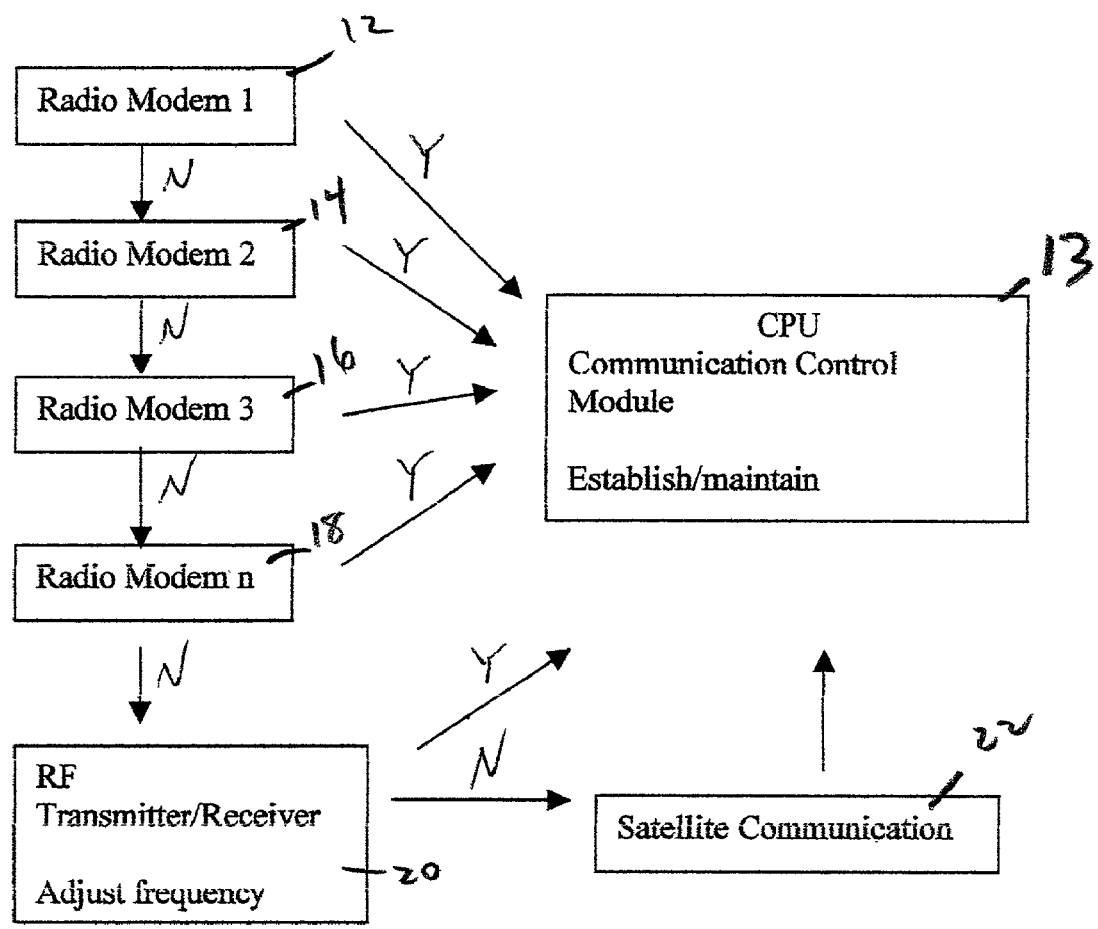
FIG. 3 is a block diagram of the data flow in the communications component or section.

FIG. 2 shows the modules in the communication component 10 while FIG. 3 shows the flowchart of the process or data flow involved in communication component 10. Control signals and data are communicated from each of the modems 12, 14, 16, 18 and 22 to CPU 13. The signals from all the various radio modems 12, 14, 16, 18 and 22 for digital wireless communication are evaluated and the one with maximum signal strength is determined. The one with maximum signal strength is selected and evaluated by CPU 13 to determine whether its output signal exceeds the threshold requirement. If the output signal exceeds the threshold requirement, that identified modem will be selected by CPU 13 for communication. Otherwise, the RF transmitter/receiver 20 will be evaluated by CPU 13 by sweeping its frequency to determine if any other frequency is suitable for the communication. If the received signal strength is insufficient, then CPU 13 will switch to satellite communication. This procedure ensures that a channel of wireless communication remains active at all times.

One of the differences between this system and any other asset tracking system, in terms of wireless communication capabilities, is that SLIP is the only device that can ensure continuous connection between an object installed with SLIP and both the communication server and other SLIP-equipped objects.

More specifically, the software of the communication component is comprised of the following integrated software elements or modules: (1) Current Connection, (2) Connection Priority, (3) Connection Check, (4) Channel Availability, (5) Switch Control, (6) Send Control, and (7) Receive Control. The functions of these elements are described below in connection with FIG. 9.

Current Connection Module

At any moment, the existing connection established through any modem 12, 14, 16, 18 or 22 or RF Transmitter/Receiver 20 is registered as current connection module 200. Data transmission to the modems is always through current connection module 200.

Connection Priority Module

Connection priority module 202 contains a table listing existing channels and the corresponding connection methods. One field in the table establishes the priority of each channel. As such, whenever the connection of a network is lost, the priority dictates which other method is to be evaluated first. Evaluation of the available networks is done in connection check module 204.

Connection Check Module

At any moment, connection check module 204 keeps evaluating the signal strength of the current connection, and the validity of the signals of the channel of the next highest priority. As such, the system always keeps one channel connected, and one backup channel to be activated whenever the current connection is lost.

Channel Availability Module

Availability of communication channels varies from place to place. The channel availability module 206 always registers the available channel at any location. This module 206 requires a constant evaluation of current position through the location position module 200. If the location of the device remains unchanged, the available channels remain unchanged. Whenever the position is different from the previous registered position by a pre-set threshold, channel availability module 206 issues a command to connection check module 204 and re-evaluates all the existing channels to determine the available channels at the new location.

Switch Control Module

Switch control module 208 activates switching of channels from the current to the next available channel of highest priority. This may occur on two occasions. First, when the signal strength of the current connection drops below a pre-set threshold, the switch control module 208 automatically switches the communication to the next available channel. Second, when the next available channel is of a higher priority than the current connection, the connection is also switched to the next available channel.

Send Control Module

Send control module 210 controls the transmission of data out of the device. Messages to be sent out are arranged in a temporary queue-storage. Each message is registered with time stamp. If a message is time sensitive with a maximum valid time, before the message is transmitted, send control module 210 compares the current time in the CPU and the time lapse since the message was issued. If the time lapse exceeds the maximum valid time, the message is moved to the storage module 15 and marked as one that is not sent due to time constraint. The storage module 15 is also designated on the memory storage 15 in FIG. 1. Thus, the memory function can be variously thought of either in the sense of a software or a hardware component depending on which aspect of the memory function is at issue. Otherwise the messages in the temporary queue-storage are sent out one after another. When the receiving device acknowledged receipt of the message, the message is moved to the storage module 15 and marked with both time sent and time received.

Receive Control Module

Receive control module 212 evaluates messages received through the current connection module 214. It always checks the validity of the message based the established protocol of each network. If any message is not valid, it will adjust the counter recording the number of consecutive invalid messages. If the number exceeds a pre-set threshold, the receive control module 212 issues a signal to switch control module 208 to switch to the next available channel of highest priority. If the message is valid, it passes it to CPU 13 for appropriate response.

Figure 9:
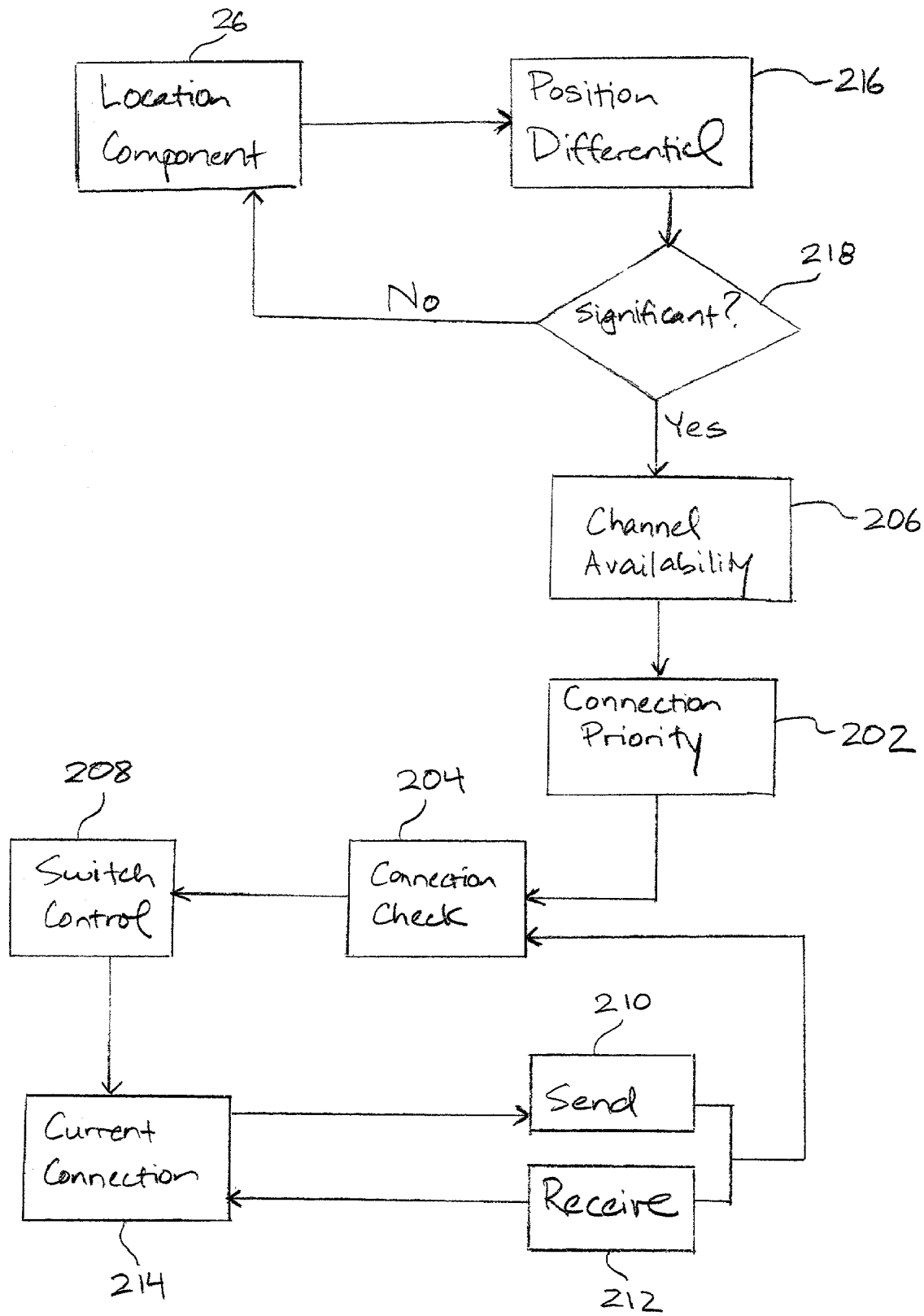
FIG. 9 is a flow diagram illustrating the operation of the software modules in the communications component.

The operation of the modules can now be understood in the context of the flow diagram of FIG. 9. Location component 26 of FIG. 2, equivalently referenced in FIG. 9 as step 26, begins with the last stored location. A differential change in position is determined at step 216, using for example internal position computation unit 36 described below in connection with FIG. 4. A decision is then made at step 218 to determine if the position differential is significant or not. If it is not, then control is returned to the start point of location component 10. If the position differential is significant, then channel availability is determined by module 206 which takes the current position from current position module 200. If the position changed by a pre-set threshold, channel availability module 206 issues a command to connection check module 204 through connection priority module 202 to re-evaluate all the existing channels to determine the available channels at the new location according to a predetermined priority. Switch control module 208 picks the best strength and highest priority channel connection, which is implemented through current connection module 214. Message traffic is then handled by send control module 210 and receive control module 212, while connection check module 204, switch control module 208 and current connection module 214 maintain an optimum connection or communication at the location, until location component 10 initiates a new location fix.

Location Detection Component

Figure 4:
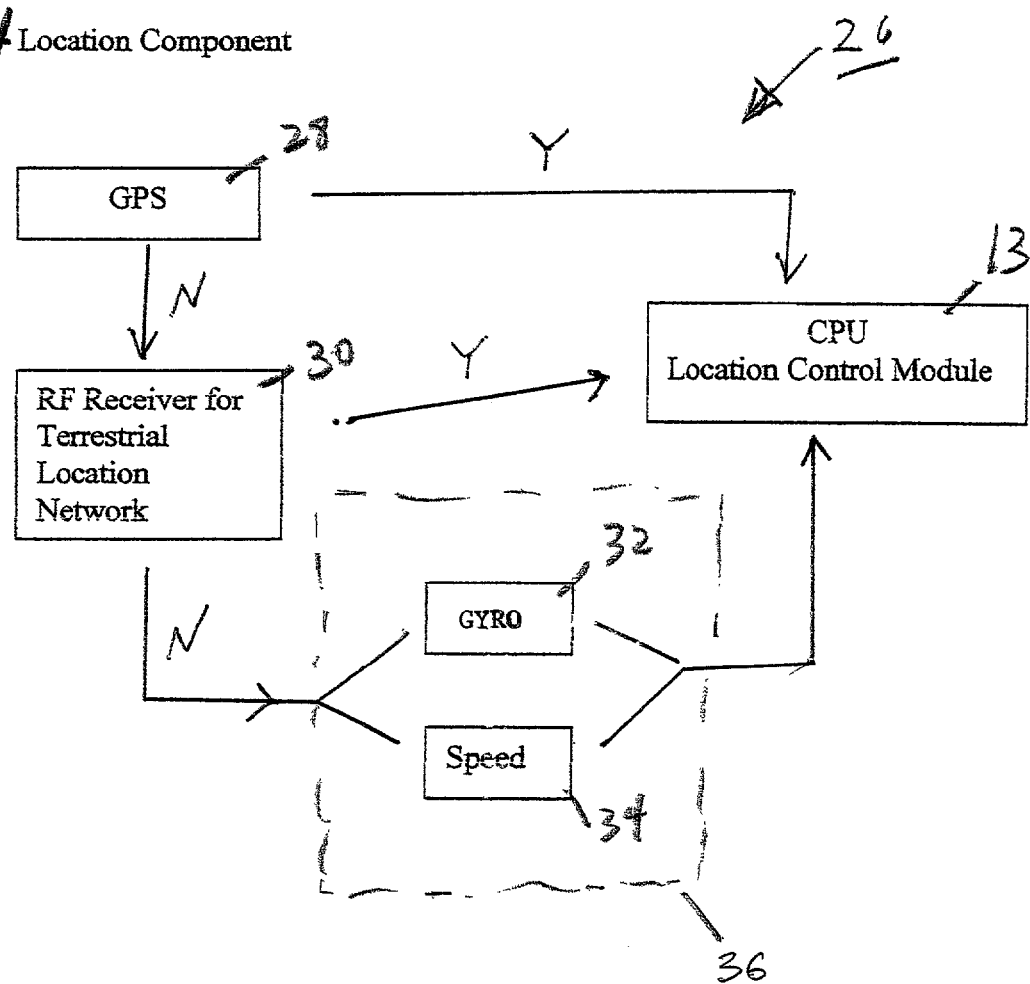
FIG. 4 is a block diagram of the location component or section.

A location detection component or section, which is generally denoted in the block diagram of FIG. 4 by reference numeral 26, is used to detect in real-time the location of the object (not shown) in which SLIP is installed. Component 26 is a combination of an engine board 28 capable of receiving satellite signals of the global positioning system (GPS), a radio frequency (RF) unit 30 to transmit and receive location information through a terrestrial communication network, and any other electronic device that can be used to effectively detect the location of the object. An example is a GPS engine board 28 using the SiRF Star I GPS chip.

Currently GPS-based asset tracking systems rely on a single GPS engine board for location detection. A single GPS engine board suffers from the fact that there are no GPS signals in certain areas, e.g., inside a tunnel, within a structure, or sometimes even in urban areas surrounded by high-rise buildings. In order to detect location one must then switch to a different mode, such as a simple terrestrial communication network, that can provide location by the method of triangulation among three or more repeaters. For this reason, a RF unit 30 must also be included in the device to provide location by a terrestrial communication network or some other means.

In addition, location detection section 26 also includes an internal position computation unit 36 with a three dimensional gyro 32 for calculating the position changes in three dimensions and a speed sensor 34 to calculate distance changes. Thus, the current exact location of the object can still be calculated by dead reckoning based on the last recorded valid navigationally fixed location. It is to be understood, of course, that all such dead reckoning calculations will cause cumulative errors over a long period of time. Therefore, it is important for SLIP to redetermine its location whenever a valid navigationally fixed reading becomes available either from the GPS engine board 28 or from the terrestrial network 30.

Each of the units 28, 30, and 36 in FIG. 4 are coupled to or communicate with a location control module or CPU 13, which is operated by software control. The software control which is required to operate the communication control module or CPU 13 in combination with the other elements described above is conventional, and one example is shown and described in connection with FIG. 6 below. However, it must be understood that one or more firmware controllers or logic controllers can be equivalently substituted for CPU 13 if desired.

Figure 5:
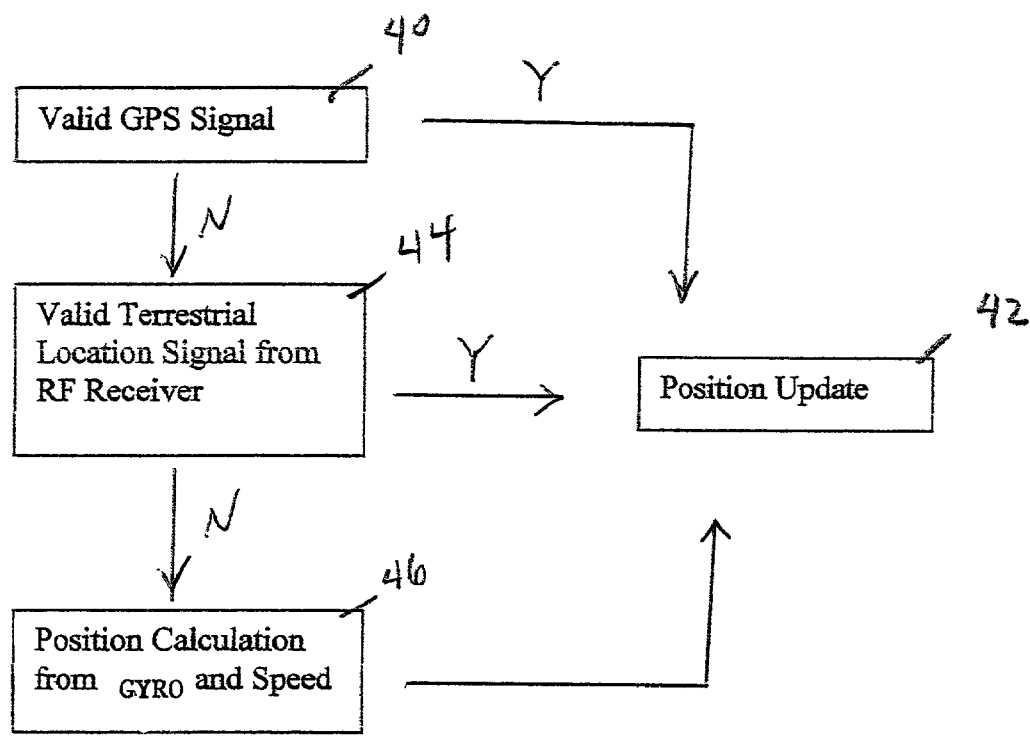
FIG. 5 is a block diagram of the data flow in the location component or section.

The block diagram of FIG. 4 illustrates architecture of the location detection component 26 and FIG. 5 shows the operational flow diagram or decision tree of component 26. The GPS signal from GPS unit 28 is always evaluated first by CPU 13 at step 40. If the signal is valid, component 26 updates by CPU 13 the position code immediately at step 42. If not, the RF receiver 30 of the terrestrial location network is activated by CPU 13 and its frequency adjusted at step 44 to determine if a valid location signal is available. If a valid location signal is available, the position code is updated by CPU 13 at step 42; otherwise, the gyro 32 and speed sensor 34 are activated by CPU 13 to calculate the change in direction and distance at step 46 since the previous valid position reading. Whenever a valid GPS reading is received, the position is automatically corrected by CPU 13 accordingly.

One of the most significant improvements of SLIP from other location detection devices is that SLIP ensures that the location information of the object is always available and sufficiently accurate.

I/O Ports

Figure 6:
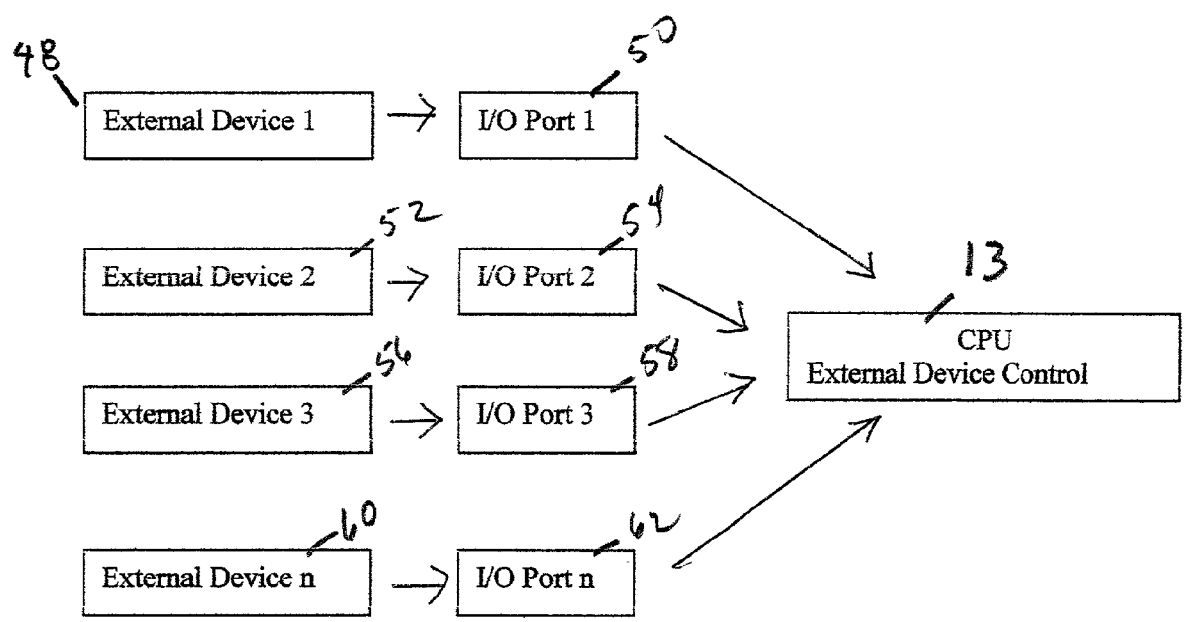
FIG. 6 is a block diagram of the input/output ports used for external function control.

A plurality of input/output ports, symbolically denoted by input/output ports 50, 54, 58 and 62, are implemented to allow for interfacing with a corresponding plurality of external devices, symbolically denoted by devices 48, 52, 56 and 60, in FIG. 6. For instance, a printer 48 can be attached to SLIP so that any time the moving object reaches a restaurant, the latest menu can be printed out if the driver requires. The printer 48 can print out copies of invoices whenever a truck leaves a location after delivery.

In the situation of school bus tracking, an external I/O port 54 can be used to support a "SmartCard" device 52, which allows SLIP to record in real-time any student that boards or leaves the bus. In this example, information may be provided about who is on board and who is not at any given time. Should an accident occur, SLIP will be able to generate an emergency call to the parents of every student on board automatically, and only the parents of those students onboard will receive such phone calls.

Another port 58 can support a door close/open device 56 so that any time the door is opened or closed, a record is saved in the memory component including when and where the event took place. Delivery trucks can use the external I/O ports for printing invoices, retrieving inventory information and invoices from other devices, such as handheld or laptop computers. A possible scenario is when a truck unloads packages at a client's site, the driver may enter the quantity of each commodity into a handheld computer. As soon as the driver puts the handheld computer into the truck and connects it to SLIP, the invoice is automatically printed out through one I/O port, and the digital record of the invoice can be automatically sent to corporate headquarters for billing and record keeping purposes. The information passing through the I/O ports 50, 54, 58 and 62 is always registered in the memory for the microprocessor 13 to generate suitable responses or reports. However, it must be understood that one or more firmware controllers or logic controllers can be equivalently substituted for CPU 13 if desired.

Figure 7:
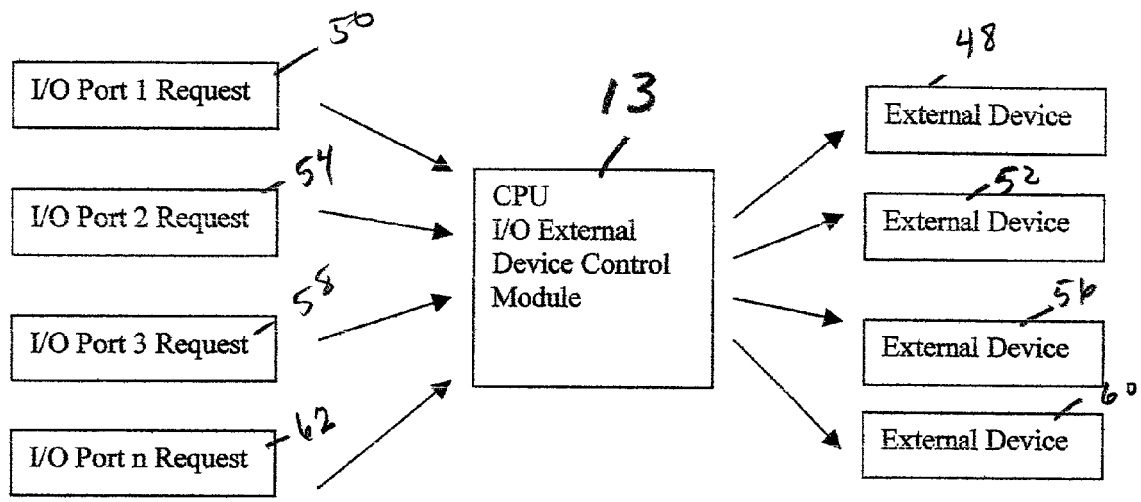
FIG. 7 is a block diagram of the data flow of the input/output ports.

FIG. 6 depicts the structure of the I/O control in SLIP and FIG. 7 illustrates its operational flowchart. All the I/O ports 50, 54, 58 and 62 are continuously checked. Whenever any port 50, 54, 58 and 62 receives any external request from a different object or from the server, the message is automatically evaluated in the CPU 13 and a suitable, pre-programmed response is issued to the appropriate I/O port 50, 54, 58 and 62 for responsive action. Such action may include activating a phone call, opening the door, reducing the speed, shutting down the engine, and others.

More particularly, referring to FIG. 10, software control of location component 26 of FIG. 4 is comprised of the following software modules: (1) GPS validity module 218; (2) terrestrial location module 222; (3) GPS position module 220; (4) position differential module 224; (5) position calculation module 226; and (6) position update module 228.

GPS Validity Module

GPS validity module 218 is used to constantly check the validity of GPS signals. A logic check is based on the validity indicator provided from the GPS signal. If the signal is valid, then the readings of latitude, longitude, speed, altitude, and time are registered in GPS position module 220. If the GPS signal is invalid and there is no position change derived from position calculation module 226, then the GPS validity module 218 continues its monitoring and no action is needed. However, if the GPS signal is invalid while the position calculation module 226 indicates a movement exceeding a pre-set threshold, then the GPS validity module 218 is marked as invalid and other positioning methods are activated.

Terrestrial Location Module

The position can also be obtained from a terrestrial location network through an RF receiver. Terrestrial location is based on triangulation of radio signals from three transmitters. Terrestrial location is derived only when the GPS signal is invalid. A computation of position differential by position differential module 224 determines if terrestrial location module 222 has returned a valid position. If the position or signal is valid, the position derived from terrestrial location module 222 is registered or stored in current position module 220. If neither the GPS signal is valid, nor the terrestrial location position, then a calculated position from position calculation module 226 is registered or stored in current position module 220.

GPS Position Module

At any moment, GPS position module 218 keeps the record of last valid GPS reading. GPS position is updated from time to time by position update module 228 whenever a next valid GPS signal is received. The flow of data is depicted in FIG. 5. A record of current position is derived from either a valid GPS position, the value of the terrestrial location position, or the position calculated from gyro and speed module 232, depending on which determination is valid. The current position may or may not be the same as the GPS position. The record is accessible to all other components in the device.

Position Differential Module

At any moment, a value determined by position differential module 224 is always available. This value is derived from the change in latitude and longitude calculated from gyro and speed module 232. If the position differential is less than a pre-set minimum, no action is needed and all the position readings remain unchanged. Only when there exists significant movement of the device will position calculation module 226 be activated.

Position Calculation Module

As the gyroscopic portion gyro and speed module 232 provides the necessary directional information about the position differential and speed portion provides the information about distance, the current position can always be calculated accordingly by position calculation module 226. If there exists a significant position differential while neither the GPS signal nor terrestrial location network is valid, the current position of the device is calculated from the direction and distance. The calculated position is then registered or stored in current position module 220.

Position Update Module

The current position of the device is updated from time to time, provided that there exists a position differential greater than the pre-set threshold. Position Update module 228 always takes the highest priority on the GPS reading, followed by the terrestrial location network. Only when neither GPS nor terrestrial location is valid will the calculated position be used to update the position of the device.

The overall operation of the location component can now be reviewed in the context of the flow diagram of FIG. 10. GPS validity module 218 is repetitively and automatically checking to see if a valid GPS fix is obtained at step 219. If it is, then at step/module 218 the position is updated by position update module 228 and stored in current position module 220. If no valid GPS fix is obtained, then the terrestrial location is determined using a land-based network by module 222, which then initiates an update in position update module 228 recorded to current position module 220. Meanwhile gryo and speed module 232 is continually feeding directional and distance data into position differential module 224, which computes the differential displacement of the object. If at step 230 this position differential exceeds a predetermined threshold the GPS fix is sought in GPS validity module 218. If the GPS validity signal is invalid a terrestrial fix is sought by terrestrial location module 222. If the terrestrial location module 222 cannot return a valid fix at step 223, then gyro and speed module 228 feeds direction and distance data to position calculation module 226 to compute a new positional fix based on the data. Position calculation module 226 then stores the new position into current position module 220.

Printed Circuit Board (PCB)

SLIP is designed to integrate all the components in one consolidated system and thus a specially designed printed circuit board (PCB) is utilized. Due to the complex nature of the system, the PCB must be designed to allow for not only supporting all the functions described above, but also providing possible expansion for multiple communication devices and location detection devices.

Micro Processor or CPU

SLIP requires integration of several embedded systems and processing of data of different sources as described above, thus a powerful central processing unit (CPU) is needed for making intelligent decisions. In the figures, the CPU has been identified as a single circuit or element. In an alternative embodiment, multiple CPU's can be operated in SLIP with a separate CPU in each module and each of the CPUs in the modules communicating with a master CPU. The location information obtained from the location detection component 26 must be interpreted immediately and adequately. Messages to be received from or to be sent to other systems must be correctly compiled and addressed. Data entering from any of the attached ports 50, 54, 58 and 62 discussed in connection with FIG. 6 must be processed for suitable response. Data to be sent out through the attached I/O 50, 54, 58 and 62 must be configured correctly.

The CPU 13 is designed to manage suitable decision-making processes of the object installed with SLIP. The inclusion of the CPU 13 integrates all the components together and generates appropriate actions according to the location of the moving object. It is important to mention that both the wireless communication component 10 and the location detection component 26 possess digital data processing capabilities. The microprocessor 13 is required in order to consolidate information of different nature and from different sources into one integrated system. The microprocessor 13 essentially controls the flow if data, interprets each data element, and generates appropriate responsive activities.

Memory Component

A memory component 15 of sufficient capacity, such as a Flash ROM, a compact flash memory card, or a small-size hard drive, must be understood as being included or communicated with CPU 13. It must be understood that the memory component may be structured in many different ways and need not be resident in a single chip, but may be distributed among a plurality of chips in SLIP or to some extent even exterior to SLIP. The memory component (not shown) is used to save the executable programs and information tables needed to operate the system. The memory component is programmable and all the parameters can be replaced or updated in real-time through wireless communication. The memory component stores the executable programs so that in the case of loss of power to the moving object, the programs remain in the system and they will perform correctly once the power is back on. The memory also stores information which is used to formulate an appropriate response to any external request. For instance, if there is a request for issuing a phone call to a specific number, that specific number and the command code to issue such an action are both stored in the memory component.

Since the information can be replaced from outside SLIP through wireless communication, the phone number to call and even the command code to issue the call can be updated in real-time, without the need to reload the program into the device. Location information about the moving object can be transmitted to a remote server or computer through wireless communication. As soon as the receiving end sends a message acknowledging the receipt of the information, and requests the previously stored information to be erased and clear the memory space, a command in the memory component handles the space cleaning automatically. Alternatively, another command can be implemented that when the information is accumulated for a long period, information of the older dates can be automatically erased to clear up the memory space.

The memory component plays an important role in maintenance of the system. Basically the executable programs, system configuration information, parameters of different functions, and any other potentially variable data can all be organized in the memory component. In real-time, any change in the stored information or even the executable programs can be replaced or updated remotely through the wireless communication network.

Figure 8:
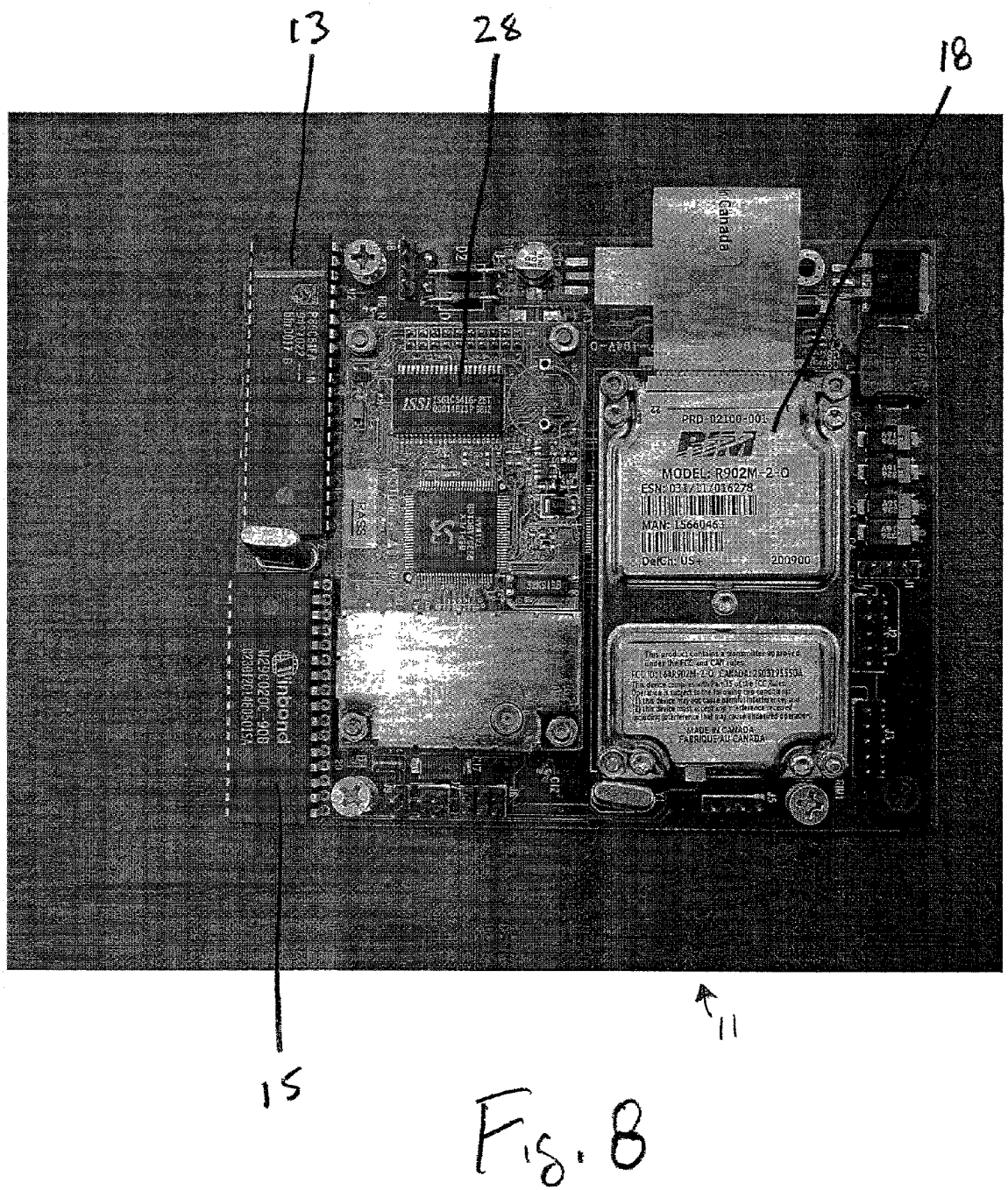
FIG. 8 is a photograph of a SLIP system on a PCB of the type diagrammatically shown in FIG. 1.

In a first prototype of SLIP, four components were laid out on a specifically designed PCB 11 as shown in the photograph of FIG. 8: a RIM902 radio modem 18 for wireless communication on the right hand side, a SiRF GPS engine board 28 for location detection in the middle, and on the left hand side there is a CPU on the top and a Flash ROM at the bottom. A power connector is on the far left-hand side of the back panel. Next to the power connector is an antenna connector for the radio modem or any other wireless communication component. To the right of the radio antenna connector are two serial connectors for external devices. On the far right-hand side is a GPS antenna connector. The I/O ports can be of any other types available. The power connector is connected to a cigarette lighter, although it may be connected to a vehicle's battery or any external power unit. A dual band antenna is connected to the radio modem connector and GPS antenna connector. All the components are connected to the PCB.

In the preferred embodiment the system is based on software solutions to overcome technical difficulties. For example, in communication, currently all the tracking devices use only one radio modem due to the existing design to take the radio input as given. As the radio input format is fixed, the existing devices do not evaluate the content of radio input. They only take the incoming data and process the data if the input is valid.

In the preferred embodiment, communication control module evaluates the content of the radio input from each channel, and evaluates any acknowledgment message from the server in the network to which it is communicating. The communication control module constantly sends requests to the server through the first channel, and always detects the response to determine if a channel switch is needed. If the input of the first choice is valid, then SLIP will use that channel for communication. If the input is not valid, then a function in the firmware will control the validity and switch to the next available channel. The same process applies to radio output. If SLIP sends a message to the server through a specific channel, and the server does not reply with a receipt acknowledgment, SLIP will re-send the request multiple times, and after a pre-set period without receipt acknowledgment, the same function will switch the communication channel. This mechanism will ensure a communication network is up all the time.

In terms of the location detection module, the current problem most common among GPS-based tracking systems is that GPS signals are not always available. At present, all the tracking systems use either the satellite signals from GPS or the triangulation mechanism based on a local radio network (RF) to detect locations. Combining these two methods requires a specially designed software algorithm to constantly check if the GPS signals are valid as described in connection with FIG. 10. If not, switching to RF is the next step. Then, if neither GPS nor RF provides position information, then position calculation based on the movement of the object is required. To detect if the GPS or RF provides valid position information requires a logical check in the software, and computation of the difference between the latest reading and the previous valid reading. The clock inside SLIP provides the time difference between the two readings. The GYRO/Speed module provides the estimated distance traveled between the times of the two readings. If the difference in position readings are significantly different from the computed distance, then the current reading is not valid and the other location detection method is needed. Since the GYRO/Speed calculation is always available, the system will always correct itself and upgrade its position with a high level of accuracy.

Advantages of the Device Over Existing Asset Tracking Technology

SLIP has the following important advantages over other existing asset tracking technology and automatic vehicle location (AVL) systems:

SLIP generates appropriate actions in response to varying location information. It is not a passive location reporting system as in many existing AVL vehicle-tracking operations. The actions in response to a request are dynamic and may vary from place to place, unlike other existing asset tracking systems or AVL systems where the response is pre-programmed and fixed.

Responsive actions and methods can be updated or replaced in real-time according to the location of the moving object. Actions and parameters inside the unit can be updated in real-time through wireless communication. There is no need for an operator to reload the program or re-configure the unit.

Automatic responses to requests from other moving objects are provided in real-time. Unlike other existing systems where each moving object must always communicate to a centralized facility for instructions, the device has an important breakthrough in that a moving object may generate actions in response to another moving object where the other moving object need not be pre-defined.

Each moving object can be configured to issue a specific vehicle code. Thus, different types of objects can be automatically differentiated accordingly. For instance, ambulances and fire engines can be warned when other such vehicles are approaching or within a set distance, and the entire operation can be fully automated without the need of human intervention.

Possible Applications

The device will be useful for a great variety of location-related applications. Some typical examples are described as follows. SLIP is ideal for protection of school children and school bus drivers. A typical example is to install such a device in school buses to provide maximum protection for school children. In light of the regulation in many states that school buses must always stop at railroad crossings, SLIP provides the following functions. First, as a bus reaches a railroad crossing, SLIP will record the speed and location of the bus to ensure that the bus has actually stopped. Second, SLIP can also record when and where the door was opened and closed. Third, SLIP can issue a warning message to the bus driver to indicate that the bus is approaching a railroad crossing and must stop at the crossing. Fourth, in case the bus failed to stop at the railroad crossing, SLIP may automatically issue an alert message to the central office immediately. Fifth, all the records will be saved inside the device for later playback of travel history. The vehicle history file will show exactly where the bus was at what time, with information regarding speed, direction, and any event such as a door close/open event or an emergency call. Most importantly, when authorized, SLIP may activate a special feature to automatically stop the bus before the railroad crossing when it senses an oncoming train within an operator-specified distance between the bus and the train if the train is also installed with SLIP and intercommunicated with the bus through a network. Thus, one of the most important functions of this device is the capability to automatically activate certain functions of one moving object in response to the location information transmitted from another moving object.

In addition to the above functions associated with railroad crossings, SLIP can be used to offer other location-related functions for school buses. For instance, the bus history records of the locations where a bus has stopped, where the door was opened and closed, etc. can be useful for tracing the route pattern. Transportation operators can evaluate bus routes and bus stop locations effectively. A panic response device can be attached to the equipment to inform the operator in any emergency situation. Call-ahead notification is another useful function, i.e., when the bus reaches a pre-specified location, the equipment may activate a phone call to inform a student's parents that the bus will arrive within a specified time. SLIP can also support passenger-counting mechanisms. For instance, a Smart Card carried by each student will be registered automatically whenever the student gets on or off the bus. As such, at any given moment, one can always tell which students are on board.

SLIP can be used for many other commercial or public safety applications. Fleet management, real-time scheduling information of public transit, express delivery, dispatch of police cars, fire engines, ambulances, and others can benefit from the device. It also allows an emergency center to locate 911 calls, and for a traveling salesman to receive critical information about a specific client from the server in the office. All police cars, fire engines, and ambulances installed with SLIP will not collide with each other due to the automatic warning function. When a fire engine and an ambulance are coming to the same intersection from different directions, their respective SLIP objects will automatically sense each other. As one of the two vehicles is stopped, the other will continue to proceed without the need to reduce speed.

All the emergency vehicles such as police cars, ambulances, and fire engines, will have a special code indicating emergency vehicle type and status. If such a car is approaching an intersection, and if the traffic light is also installed with SLIP, then the traffic light can be automatically changed to ensure the full speed of the emergency vehicle while turning the light red to block vehicles in other directions.

When a car installed with SLIP is reported stolen, the device will automatically issue a signal to neighboring police cars to inform the police that the vehicle is stolen. Furthermore, if authorized, police may utilize SLIP to issue an engine shutdown command to that stolen vehicle and stop that vehicle.

A vehicle installed with SLIP can automatically adjust itself according to current location information. For instance, when it crosses the time zone, and detects the correct local time, it may automatically reset its clock accordingly. The cruise control will also change speed according to the speed zone. When the driver sets the speed to "speed limit", SLIP will cause the vehicle to travel at the corresponding speed limit of the particular freeway, road or highway. When it detects other SLIP equipped vehicles within a short range and at a lower speed, it will automatically reduce speed to avoid accidents.

Many alterations and modifications may be made by those having ordinary skill in the art without departing from the spirit and scope of the invention. For example, the illustrations given above should not in any sense be read as limiting the number or nature of applications to which the SLIP system may be applied or combined. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. An apparatus for communication to a network through a plurality of different external wireless data comprising:
   a communication component for uninterrupted communication to the network, the communication component comprising a plurality of wireless modems, each modem communicating with different ones of the external wireless data networks;
   a plurality of objects;
   a location circuit installed in each object which detects variable location information of the corresponding object in real-time;
   a processor with memory installed in each object coupled to the location circuit, which processor receives the variable location information and activates responsive functions according to the corresponding object's current location and which processor stores a plurality of historical events of the corresponding object in a history file, of which at least some events are correlated with responsive functions automatically undertaken with respect to the corresponding object, the history file including events related solely to the location of the object without relationship to other ones of the plurality of objects, the history file being communicated to a network communication server connected to the network for processing the history file for data analysis or for selective intelligent action by the network communication server including communication by the network communication server outside the network; and a communication circuit coupled to the communication component and installed in each object coupled to the processor in the same object to transmit without interruption by means of modem selection based on signal characteristics and to receive messages without interruption with the network communication server within the network and directly between other ones of the plurality of objects, wherein the processor corresponding to a first object automatically activates selected functions controlling the first object in response to the variable location of a second object by means of communication without interruption through the network communication server or directly with the second object through one or more of the plurality of different external wireless data networks.

2. The apparatus of claim 1 in further combination with a satellite of a global positioning system and where the location circuit comprises a GPS receiver communicating with the satellite of the global positioning system and communicating with a terrestrial location detection network to determine the position of the object from a combination of signals from the global positioning system and terrestrial location detection network.

3. The apparatus of claim 1 in further combination with a satellite of a global positioning system and wherein the location circuit comprises a GPS receiver communicating with the satellite of the global positioning system and an independent terrestrial location detection network in combination where the processor in each object controls the location circuit in the same object to first determine location of the corresponding object using the GPS receiver and then uses the independent terrestrial location detection network to determine location only if the GPS receiver fails to provide valid locational information.

4. The apparatus of claim 1 wherein the events of the history file stored by the processor in each object correlated to a contingent action includes location, time of day, speed, and direction of the corresponding object for each event.

5. The apparatus of claim 4 wherein the events of the history file stored by the processor in each object include the type of the event categorized according to its correlated contingent action.

6. The apparatus of claim 5 wherein the events of the history file stored by the processor in each object include sent and received messages.

7. The apparatus of claim 1 in further combination with a remote server communicated through the network with one of the first and second objects wherein an event of the history file stored by the processor in each object is sent to the remote server and then cleared by the processor in the corresponding object from the memory in the corresponding object.

8. The apparatus of claim 7 wherein at least one of the objects is mobile, and wherein location information, and information relating to an event, are submitted from an object to the remote server or to other objects, and the information recorded in the mobile object are cleared by the processor in the corresponding object from the memory in the corresponding object on a periodic basis.

9. The apparatus of claim 7 wherein at least one of the objects is mobile, and wherein location information, and information relating to an event, are submitted from an object to the remote server or to other objects, and the information recorded in the mobile object are cleared by the processor in the corresponding object from the memory in the corresponding object at the time that event of the history file stored by the processor in each object is sent to the remote server.

10. The apparatus of claim 1 wherein the communication circuit in each object comprises a plurality of two-way wireless modems providing at least one independent terrestrial location detection signal, a satellite modem providing at least one GPS signal and a frequency adjustable transceiver in each object coupled to the wireless modems and satellite modem in the corresponding object, wherein the processor in each object is coupled to and controls the frequency adjustable transceiver in the corresponding object to select a best quality signal from the wireless modems in the corresponding object, but if the best quality signal from the wireless modems in the corresponding object fails to satisfy a predetermined threshold, then the processor in each object controls the frequency adjustable transceiver in the corresponding object to select a quality signal from the satellite modem in the corresponding object.

11. The apparatus of claim 1 wherein the communication circuit comprises a two-way radio for communicating with each of the objects wherein at least one object has locational information which is shared with the other objects, wherein the processor in each object stores all valid location fixes and wherein the location circuit in the corresponding object comprises a GPS engine board, a receiver for communication to the network coupled to the GPS engine board, and a position computation circuit coupled to the receiver, the GPS engine board, receiver and position computation circuit being coupled to the processor, wherein the processor in each object controls the GPS engine board in the corresponding object to determine location of the corresponding object, but if the GPS engine board in the corresponding object fails to provide a valid location fix, the processor in the corresponding object then controls the position computation circuit in the corresponding object to provide a location by dead reckoning based on the last recorded valid location fix.

12. The apparatus of claim 11 where the position computation circuit in the each object comprises a gyro and a speed sensor to provide dead reckoning input data from which the processor in the corresponding object calculates a dead reckoning location.

13. The apparatus of claim 1 further comprising a plurality of input/output ports in the corresponding object coupled in circuit to the processor in each object and a plurality of external devices in the corresponding object coupled in circuit to the plurality of input/output ports in the object.

14. A method comprising:

communicating without interruption with a plurality of objects to a network through a plurality of wireless modems, each modem communicating with different ones of a plurality of external wireless data networks;

detecting variable location information of a plurality of objects in real-time in a corresponding location circuit in each object;

inputting the variable location information into a processor in each object with memory in the corresponding object coupled to the location circuit in the corresponding object;

storing a plurality of historical events of each object in a history file in the memory in the corresponding object, including events related solely to the location of the object without relationship to other ones of the plurality of objects;

transmitting messages from an object without interruption by means of modem selection based on signal characteristics to a network communications server connected to the network and to other ones of the plurality of objects;

activating a responsive function in the object through a network according to the corresponding object's variable location, wherein the processor corresponding to the corresponding object automatically activates a selected responsive function to control the same object in response to the variable location of the other one of the objects, and communicating without interruption the history file from the object to the network communication server for processing the history file for data analysis or for selective intelligent action by the network communication server including communication by the network communication server outside the network.

15. The method of claim 14 in further combination with at least one satellite of a global positioning system and wherein detecting location information of at least one object in real-time comprises communicating a GPS receiver in the corresponding object with at least one satellite of the global positioning system, and wherein detecting location information of at least one object in real-time comprises communicating the corresponding object with a terrestrial location detection network.

16. The method of claim 14 in further combination with a satellite of a global positioning system wherein detecting location information of at least one object in real-time comprises communicating a GPS receiver in the corresponding object with the satellite of the global positioning system and an independent terrestrial location detection network in combination, wherein communicating a GPS receiver in the corresponding object with at least one satellite of the global positioning system and the independent terrestrial location detection network in combination comprises controlling the location circuit in the corresponding object to first determine location using the GPS receiver in the corresponding object and then communicating the corresponding object with the independent terrestrial location detection network to determine location only if the GPS receiver in the corresponding object fails to provide valid locational information.

17. The method of claim 14 wherein storing events of the corresponding object in a history file comprises storing location, time of day, speed, and direction of the corresponding object for each event relating to the corresponding object.

18. The method of claim 17 wherein storing events of the corresponding object in a history file comprises storing the type of the event relating to the corresponding object.

19. The method of claim 18 wherein storing events of the corresponding object in a history file comprises storing sent and received messages relating to the corresponding object in the corresponding object.

20. The method of claim 14 further comprising communicating with a remote server through the network with one object wherein an event of the history file stored by the processor in the corresponding object is sent to the remote server and then cleared by the processor in the corresponding object from memory in the corresponding object.

21. The method of claim 20 wherein clearing the event of the history file in the corresponding object is performed on a periodic basis.

22. The method of claim 20 wherein clearing the event of the history file in the corresponding object is performed at the time that event of the history file stored by the processor in the corresponding object is sent to the remote server.

23. The method of claim 14 wherein at least one of the objects is moving.

24. The method of claim 14 wherein transmitting messages from the object comprises transmitting through a plurality of wireless modems, a satellite modem and a frequency adjustable transceiver in the corresponding object coupled to the wireless modems and satellite modem in the corresponding object, wherein the processor in the corresponding object is coupled to and controls the frequency adjustable transceiver in the corresponding object to select a best quality signal from the wireless modems in the corresponding object, but if the best quality signal from the wireless modems in the corresponding object fails to satisfy a predetermined threshold, then the processor in the corresponding object controls the frequency adjustable transceiver in the corresponding object to select a quality signal from the satellite modem in the corresponding object.

25. The method of claim 14 further comprising communicating with each of the objects by means of a two-way radio, wherein at least one of the objects has locational information stored therein which is communicated to another object, and storing all valid location fixes in the corresponding object and wherein detecting location information in the corresponding object comprises operating in each object a GPS engine board, a receiver for communication to the network coupled to the GPS engine board, and a position computation circuit coupled to the receiver in the corresponding object, the GPS engine board, receiver and position computation circuit being coupled in each object to the processor in the corresponding object, the processor in each object controlling the GPS engine board in the corresponding object to determine location of the corresponding object, but if the GPS engine board in the corresponding object fails to provide a valid location fix, the processor in the corresponding object then controlling the position computation circuit in the corresponding object to provide a location by dead reckoning based on the last recorded valid location fix.

26. The method of claim 25 wherein providing a location by dead reckoning in the corresponding object comprises:

using a gyro and a speed sensor in the corresponding object to provide dead reckoning input data and calculating a dead reckoning location using the processor in the corresponding object.

27. The method of claim 14 further comprising communicating in each object through a plurality of input/output ports between the processor and a plurality of external devices coupled the plurality of input/output ports in the corresponding object.

* * * * *